UNITED STATES PATENT OFFICE.

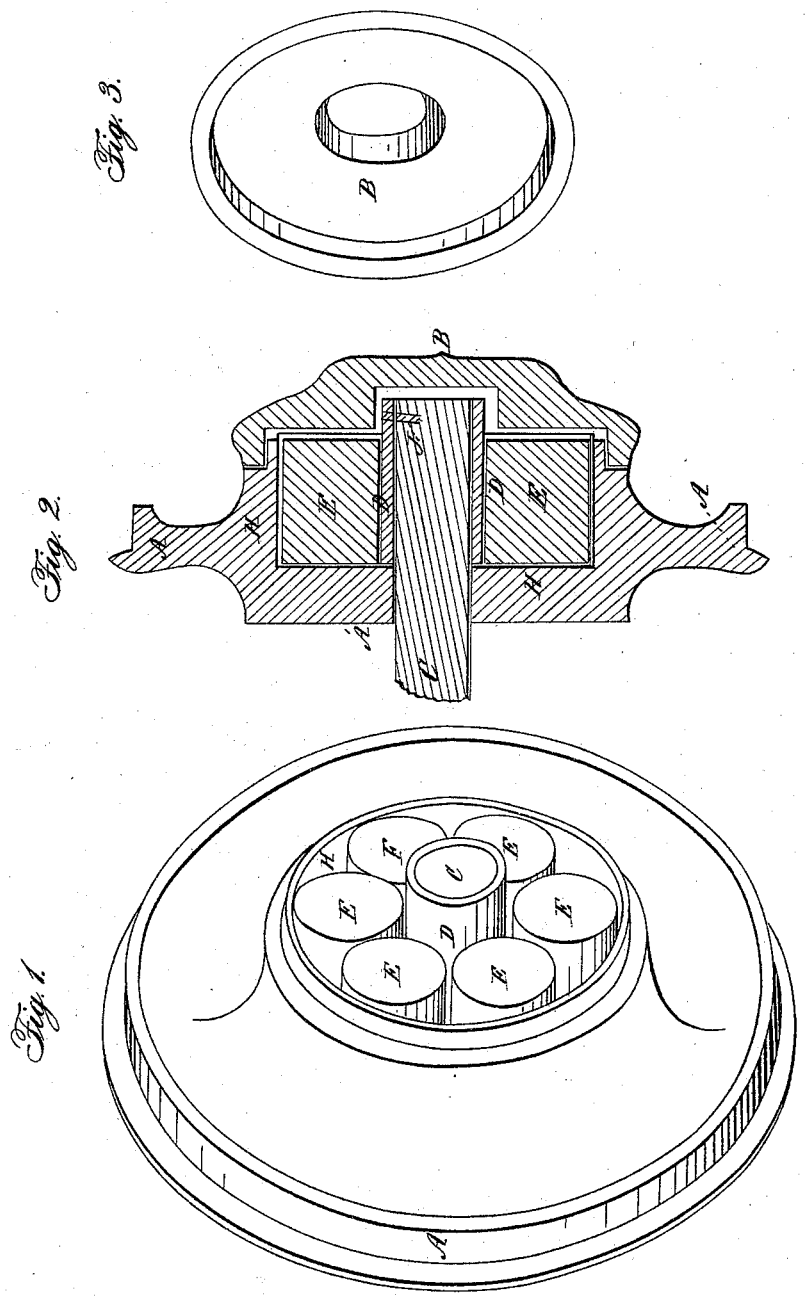

O. O. VAN ORMAN, OF HARRISVILLE, OHIO, ASSIGNOR TO HIMSELF AND H. F. PALMER, OF SAME PLACE.

IMPROVEMENT IN RAILROAD-CAR WHEELS.

Specification forming part of Letters Patent No. 33,273, dated September 10, 1861.

*To all whom it may concern:*

Be it known that I, O. O. VAN ORMAN, of Harrisville, in the county of Medina and State of Ohio, have invented certain new and useful Improvements in Railroad-Car Wheels; and I do hereby declare that the following is a full and complete description of the construction and operation of the same, reference being had to the accompanying drawings, making a part of this specification, in which—

Figure 1 is a perspective view of the wheel with the cap removed. Fig. 2 is a transverse section. Fig. 3 is a perspective view of the cap.

The same letters of reference refer to like parts in the different views.

My improvement relates to a car-wheel arranged with friction-rollers around the axle, by means of which the wheel revolves with greater ease and adjusts itself to turn a curve smoothly, overcoming the friction that is usually produced by a rigid axle, thereby preventing the torsion and straining of the wheel and axle.

In Figs. 1 and 2, A represents the tread and flange of the wheel, which is of the usual form. Toward the center the wheel widens out on both sides, as shown in Fig. 2, forming a chamber H inside for the sleeve D and rollers, on the outside of which is placed the cap or covering B, which is removed in Fig. 1 to show clearly the position of the axle, sleeve, and rollers. The axle C passes through the inside piece A' of the wheel and fits in the sleeve D that occupies the center of the chamber H, being surrounded by the rollers E, which are six in number and are of a uniform size, and together with the sleeve D fit closely in the chamber H. The number of rollers may be more or less, according to their size and the space they are designed to occupy. The sleeve D is secured to the axle by a screw J and turns with it, revolving the friction-rollers. The sleeve and axle extend out beyond the rollers, as shown in Figs. 1 and 2, for the purpose of giving a more firm support to the axle, and as the axle and sleeve revolve the rollers turn also, giving a pliable and smooth motion to the wheel, and it adjusts itself much more easily to an uneven surface when turning a curve than when the axle is arranged in the ordinary way, thus overcoming the friction usually produced, and preventing the straining and wearing out of the machinery.

Fig. 3 represents the cap or covering for the outside of the wheel that is placed on in Fig 2. The sleeve D, fitting as it does closely to the outer end of the axle-tree, and to which it is secured by the screw J, serves the double purpose of a bearing for the rollers E and the holding of the axle-tree and wheel together, thereby giving the longest possible bearing to the axle.

I am aware that nests and systems of rollers have been before devised and constructed. I therefore do not claim such *per se;* but—

What I do claim as my improvement, and desire to secure by Letters Patent, is—

The sleeve D, in combination with the axle C, cap B, chamber H, and rollers E, when constructed, arranged, and operated as and for the purpose set forth.

O. O. VAN ORMAN.

Witnesses:
    W. H. BURRIDGE,
    H. F. PALMER.